Sept. 4, 1934.  F. HUME  1,972,384
SHAFT BEARING
Original Filed Nov. 30, 1925
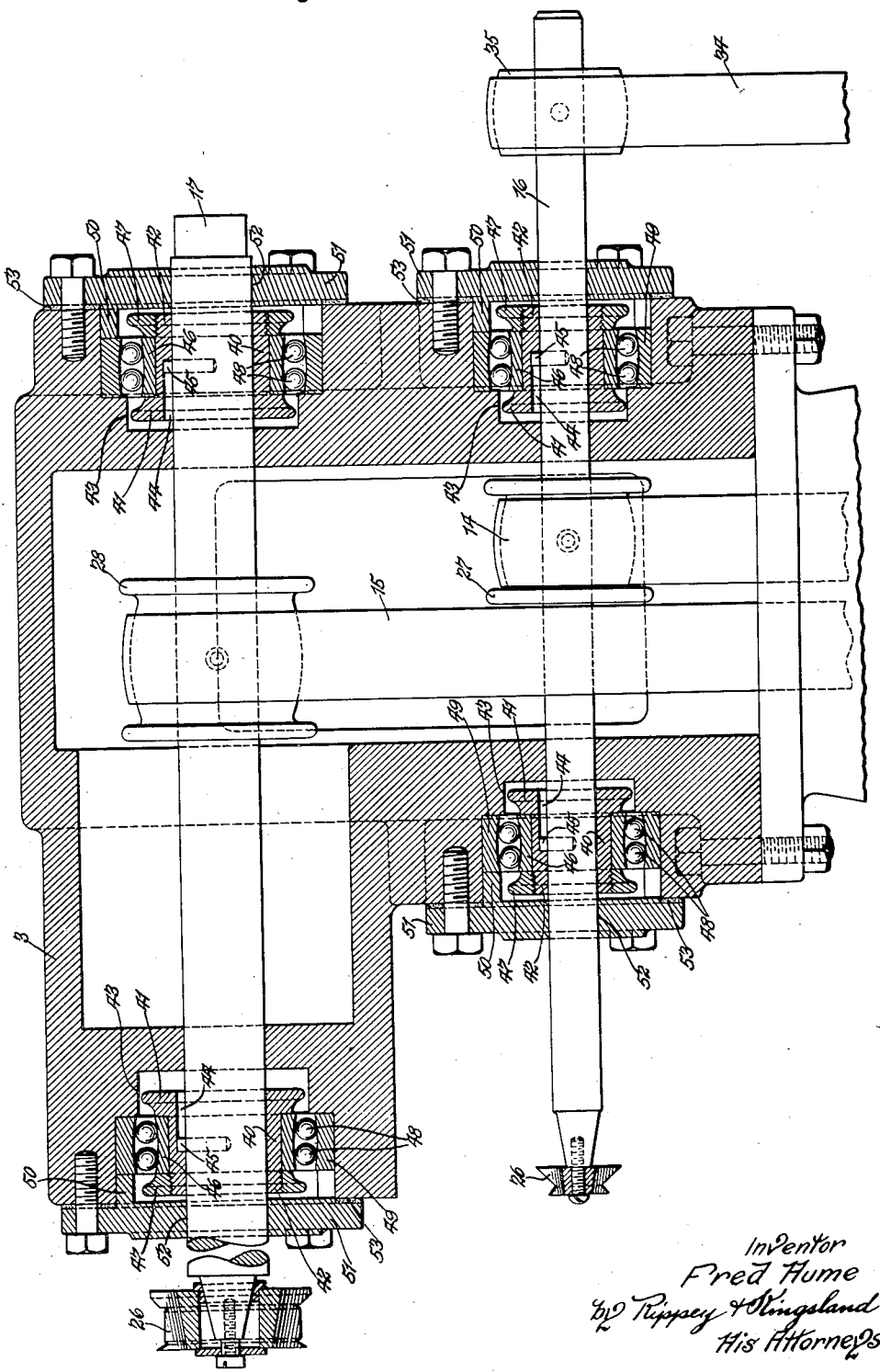
Inventor
Fred Hume
by Rippey & Kingsland
His Attorneys.

Patented Sept. 4, 1934

1,972,384

UNITED STATES PATENT OFFICE 1,972,384

SHAFT BEARING

Fred Hume, St. Louis, Mo., assignor to International Shoe Company, St. Louis, Mo., a corporation of Delaware Continuation of application Serial No. 72,141, November 30, 1925. This application November 6, 1931, Serial No. 573,336

4 Claims. (Cl. 308—236)

This invention relates to improvements in shaft bearings.

An object of the invention is to provide an improved mounting for shafts adapted to rotate at a high speed whereby vibration of the shaft will be reduced and which mounting is made readily accessible for repairs and replacements.

This application is a continuance of application Serial No. 72,141, filed November 30, 1925.

The invention consists generally in the construction, arrangement and combinations of parts hereinafter disclosed and claimed and the specific advantages of the construction will be readily apparent from the following description thereof, taken in connection with the accompanying drawing which is a vertical section through a shoe trimmer head showing in detail the mountings for the shafts.

As illustrated in the drawing, the invention of the application has been shown as embodied in a shoe trimmer for the reason that it exemplifies the necessary modifications of the invention to the best advantage, although it will be understood that the construction of the invention may be incorporated in any machine requiring a relatively high speed of rotation of shafts.

The trimmer shafts 16 and 17 are mounted transversely of the head 3, said shafts extending outwardly beyond the head and carrying trimmers 25 and 26 respectively. The shafts 16 and 17 are driven respectively from the belts 14 and 15 operating over pulleys 27 and 28. The shaft 16 may carry a pulley 35 driving a belt 34 for the operation of a grinder not shown in the drawing.

It will be understood that the speed at which the parts of the machine described operate is at a relatively high rate. Heretofore, in practice, considerable difficulty has been experienced in maintaining the operating shafts thereof in alinement and in preventing the shafts from chattering and becoming extremely noisy in use. Particularly is this true in reference to the trimmer shafts mounted in the head of the machine. Furthermore, considerable difficulty has been experienced in replacing or repairing the trimmer shafts, the present method of mounting the same requiring the head to be taken apart at considerable labor and expense for effecting the repairs.

The disadvantages have been obviated by the provision of the improved mounting for said shafts which includes the provision of a cone comprising a conical sleeve member 40 having a head 41 at one end, the opposite end of said member being exteriorly threaded at 42. The sleeve member 40 is slidably fitted over the shaft 16 and the head 41 extends into a recess 43 in the side of the cutter head. There is an internal groove 44 extending from the inner face of the sleeve member 40 into which the extending end of a pin 45 fitted into the shaft 16 extends.

It is to be understood that the sleeve member 40 is so fitted as to float on the shaft and has unrestrained movement relative thereto except as limited by engagement of the pin 45 with the inner end of the groove 44.

The inner ring 46 of a ball bearing is fitted over the outer periphery of the member 40, the inner edge of which abuts against a shoulder formed by the head 41, said inner ring being held rigidly in place by a ring 47 fitted over the end 42 of the member 40, the inner face of said ring 47 abutting against the outer edge of the ring 46. The outer face of the bearing ring 46 is slightly concave to form one wall of a raceway for parallel rows of ball bearings 48 over which is mounted the other ring 49 of the bearing member which fits into an enlarged portion of the recess 43 in the cutter head, the inner edge of said ring 49 abutting closely against the shoulder formed between the reduced portion and the enlarged portion of said recess. It will be noted also that the inner face of the ring 49 is concave, forming the other wall of the raceway for the ball bearing members 48.

The outer ring of the bearing member is held in place by a series of lugs 50 extending inwardly at spaced intervals from the outer face of plate 51. The plate 51 is secured against the face of the cutter head around the margin of the opening to the recess 43, said plate 51 having a central opening 52 that fits over the shaft 16. It is preferred that a gasket 53 be placed between the matched edges of the face of the cutter end of the plate 51 to prevent leakage of the lubricant at the joint.

Since the mountings for the shafts 16 and 17 are of duplicate construction, except for dimensions, it is unnecessary to describe them separately and the same numerals are applied to the corresponding parts of the mountings for both shafts.

A bearing assembly has been provided in which the inner ball race may move axially in one direction with reference to the shaft. This is accomplished by the internal groove 44 in the sleeve 40 which accommodates the pin 45 having an abutting engagement with the dead end of the groove 44. The result of this arrangement is that the shaft and inner ball race of the bearing are free to vibrate on their own frequencies except that the vibration of one frequency tends to dampen the vibration of the other frequency and thus prevents the shaft from chattering. The full effect of the arrangement is secured when a bearing is placed on each end of the shaft thereby permitting the shaft to deflect in one direction without deflection of one bearing.

The construction also permits ready access to the shaft mounting insofar as it is only necessary to remove the plates 51 and the rings 47 to disassemble the mounting. Therefore, repairs of the mounting are greatly facilitated.

I am aware that the invention may be modified in certain particulars without departing from the spirit and scope thereof. What I claim and desire to secure by Letters Patent is:

1. The combination including a stationary support, a shaft, an outer ball race fixed with respect to the support, an inner ball race, a sleeve mounted on the shaft and to which is secured said inner ball race, and a pin secured to and radially projecting from the shaft into a groove in the inner face of the sleeve, said groove extending longitudinally from an outer edge of the sleeve and terminating short of the other edge and having the dead end of the groove normally abutting said pin, the sleeve being otherwise longitudinally unrestrained on the shaft whereby an axial deflection of the shaft in one direction will not deflect the sleeve.

2. The combination including a stationary support, a shaft, and a bearing assembly on each end of the shaft comprising an outer ball race fixed with respect to the support, an inner ball race, a sleeve mounted on the shaft and to which is secured said inner ball race, and a pin secured to and radially projecting from the shaft into a groove in the inner face of the sleeve, said groove extending longitudinally from an outer edge of the sleeve and terminating short of the other edge and having the dead end of the groove normally abutting said pin, and the grooves in the two assemblies being oppositely disposed, the sleeve being otherwise longitudinally unrestrained on the shaft whereby an axial deflection of the shaft in either direction will deflect the sleeve of but one assembly.

3. The combination including a stationary support, a shaft, an outer ball race fixed with respect to the support, an inner ball race, a sleeve mounted on the shaft and to which is secured said inner ball race, and an abutment on the shaft normally engaging the inner side of said sleeve, the sleeve being otherwise longitudinally unrestrained on the shaft whereby an axial deflection of the shaft inwardly will not deflect the sleeve.

4. The combination including a stationary support, a shaft, and a bearing assembly on each end of the shaft comprising an outer ball race fixed with respect to the support, an inner ball race, a sleeve mounted on the shaft and to which is secured said inner ball race, and an abutment on the shaft normally engaging the inner side of said sleeve, the sleeve being otherwise longitudinally unrestrained on the shaft whereby an axial deflection of the shaft in either direction will deflect the sleeve of but one assembly.

FRED HUME.